(12) United States Patent
Zhao et al.

(10) Patent No.: US 9,182,822 B2
(45) Date of Patent: Nov. 10, 2015

(54) INTERACTIVE DISPLAY UNIT

(75) Inventors: Yanning Zhao, Burscheid (DE);
Andreas Eppinger, Bergisch Gladbach (DE); Daniel Jendritza, Krefeld (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 68 days.

(21) Appl. No.: 13/982,882

(22) PCT Filed: Dec. 29, 2011

(86) PCT No.: PCT/EP2011/074220
§ 371 (c)(1),
(2), (4) Date: Oct. 2, 2013

(87) PCT Pub. No.: WO2012/103996
PCT Pub. Date: Aug. 9, 2012

(65) Prior Publication Data
US 2014/0307179 A1      Oct. 16, 2014

(30) Foreign Application Priority Data

Feb. 1, 2011   (DE) .......................... 10 2011 009 968
Jun. 27, 2011  (DE) .......................... 10 2011 078 127

(51) Int. Cl.
*G08C 21/00*  (2006.01)
*G06F 3/01*   (2006.01)
(Continued)

(52) U.S. Cl.
CPC ................ *G06F 3/016* (2013.01); *B60K 35/00* (2013.01); *B60W 50/16* (2013.01); *G03H 1/02* (2013.01);
(Continued)

(58) Field of Classification Search
CPC .................. G03H 1/02; G03H 1/2294; G03H 2001/0061; G03H 2001/0264; G03H 2001/0268; G03H 2001/2271; G06F 3/016; G06F 3/414
See application file for complete search history.

(56) References Cited

U.S. PATENT DOCUMENTS

2005/0057528 A1*  3/2005  Kleen ........................... 345/173
2007/0080951 A1*  4/2007  Maruyama et al. ........... 345/173
(Continued)

FOREIGN PATENT DOCUMENTS

DE   10 2008 000 467 A1   9/2009
DE   10 2008 013 274 A1   9/2009
(Continued)

OTHER PUBLICATIONS

Office Action dated Aug. 26, 2014, in corresponding Japanese Application No. 2013-552122, and English translation, 4 pages.
(Continued)

*Primary Examiner* — Michael Pervan
*Assistant Examiner* — Andrew Lee
(74) *Attorney, Agent, or Firm* — Foley & Lardner LLP

(57) ABSTRACT

An interactive display unit for presenting information and for interacting with a user, in particular in a vehicle interior, includes at least one imaging cell including a photorefractive polymer material layer between two transparent substrate carriers in a sealing arrangement. Each substrate carrier includes a transparent electrode layer that faces the photorefractive polymer material layer. A writing light source with a propagation oriented in the direction of the photorefractive polymer material layer is arranged on one of the substrate carriers in a parallel manner with respect to the substrate carrier. A haptic sensor/actuator unit is arranged on the other substrate carrier, and at least one reading light source with a propagation oriented in the direction of the photorefractive polymer material layer is arranged in a lateral manner.

10 Claims, 1 Drawing Sheet

Figure 1:
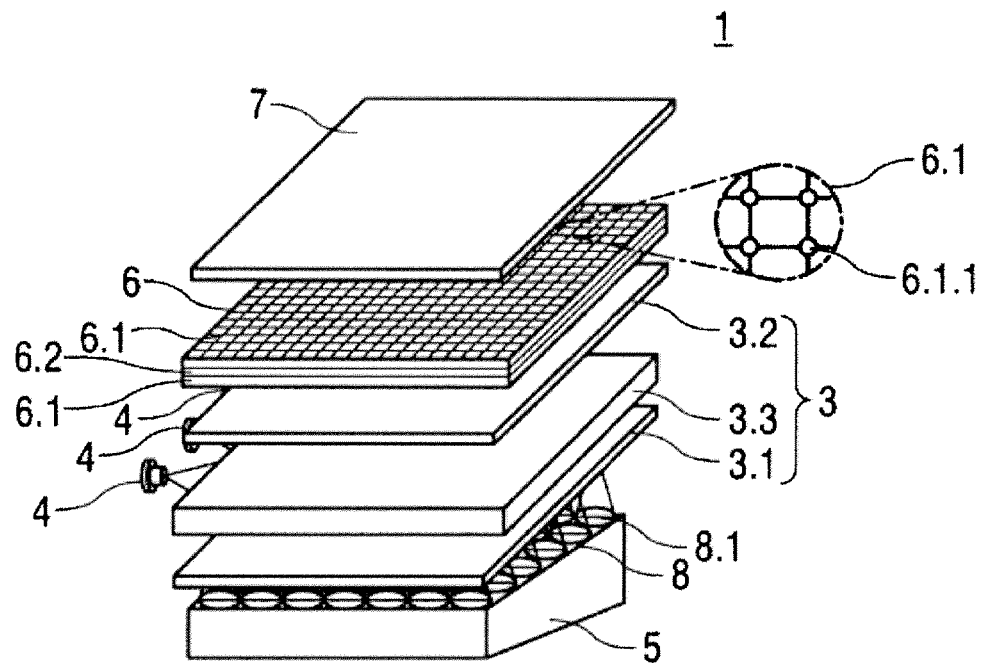

(51) Int. Cl.
  *G03H 1/02* (2006.01)
  *G03H 1/22* (2006.01)
  *G06F 3/041* (2006.01)
  *B60W 50/16* (2012.01)
  *B60K 35/00* (2006.01)
  *G06F 1/16* (2006.01)
  *G03H 1/00* (2006.01)

(52) U.S. Cl.
  CPC ............ *G03H 1/2294* (2013.01); *G06F 1/1643* (2013.01); *G06F 3/041* (2013.01); *G06F 3/0414* (2013.01); *B60K 2350/1032* (2013.01); *B60K 2350/1072* (2013.01); *G03H 2001/0061* (2013.01); *G03H 2001/0264* (2013.01); *G03H 2001/2271* (2013.01); *G03H 2225/25* (2013.01); *G03H 2260/54* (2013.01)

(56) References Cited

U.S. PATENT DOCUMENTS

| | | | |
|---|---|---|---|
| 2009/0046333 A1* | 2/2009 | Peyghambarian et al. | 359/7 |
| 2010/0066686 A1* | 3/2010 | Joguet et al. | 345/173 |
| 2010/0152794 A1 | 6/2010 | Radivojevic et al. | |
| 2011/0228040 A1* | 9/2011 | Blanche et al. | 348/14.07 |

FOREIGN PATENT DOCUMENTS

| | | |
|---|---|---|
| DE | 102008013274 A1 * | 9/2009 |
| EP | 2 000 885 A1 | 12/2008 |
| JP | 10-187332 H | 7/1998 |
| JP | 2002-049295 | 2/2002 |
| JP | 2002-055630 | 2/2002 |
| JP | 2011-002926 | 1/2011 |
| KR | 10-2007-0023662 | 2/2007 |
| WO | WO-2005/076723 A2 | 8/2005 |
| WO | WO 2006/075267 | 7/2006 |

OTHER PUBLICATIONS

International Search Report received in PCT/EP2011/074220 dated Mar. 27, 2012.

Office Action received in German Application No. 10 2011 078 127.7 dated Nov. 9, 2012.

Tay S et al., "An updatable holographic three-dimensional display", Nature: International Weekly Journal of Science, Feb. 1, 2008, pp. 694-698, vol. 451, No. 7179.

Office Action dated Oct. 31, 2014 in corresponding Korean application No. 10-2013-7022924 and English translation, 7 pages.

* cited by examiner

INTERACTIVE DISPLAY UNIT

CROSS REFERENCE TO RELATED APPLICATIONS

The present application is a U.S. National Stage of International Application No. PCT/EP2011/074220 filed on Dec. 29, 2011, which claims the benefit of German Patent Application No. 10 2011 009 968.9 filed on Feb. 1, 2011, and German Patent Application No. 10 2011 078 127.7 filed Jun. 27, 2011, the entire disclosures of all of which are incorporated herein by reference.

The invention relates to an interactive display unit for presenting information and/or for interaction with a user, in particular in a vehicle interior.

A person's physiology of visual perception enables him or her to observe the environment in three dimensions. The three-dimensional presentation of information is also used, for example, in display units. The three-dimensional technology that is currently known is based for example on stereoscopic methods as are used in television and/or movie theaters. Also known are digital image fusion and two-dimensional semitransparent screens. However, the three-dimensional presentation of information has hitherto rarely been used in the automotive sector, such as for example information on the dashboard.

Another important part of human physiology of perception is haptic perception. We communicate functional signals by touch as effectively as emotions. Even though visual perception often offers more diverse perception than haptic perception, the range of haptic perception is still astonishingly broad, and haptic perception is of fundamental importance especially for physical user interfaces.

The integration of haptic perception in particular in touch-sensitive display units, or touch displays, permits direct interaction between man and machine, which significantly improves the user friendliness of these display units.

A large number of mobile devices with touch-sensitive display units are currently available, which typically support optical and visual feedback but no haptic feedback for the user.

Known in this context are technical switch elements, such as a micro switch, which is based on a snap-action system for changing the conduction path and is thus used as a standard component in many electric devices. Also known are snap-action plates made of silicone rubber or metal domes, which have a noticeable pressure point, where the resulting clicking effect is mainly perceived by tactile sensation.

Also known are piezoactuators, which convert voltage into a logic signal by utilizing the piezoelectric effect.

With the development of user interfaces in the automotive sector, high demands are made in particular on user interfaces, which are intended to allow a compact size while permitting flexibility of use.

One possible challenge is for example the development of user interfaces with touch-sensitive display units which allow a variable configuration of the keys.

It is therefore the object of the present invention to specify a display unit which is improved with respect to the prior art and which makes possible a three-dimensional presentation of information and direct interaction between user and machine.

The object is achieved according to the invention by an interactive display unit having the features of claim 1.

Preferred embodiments and developments of the invention are specified in the dependent claims.

An interactive display unit for presenting information and/or for interaction with a user, in particular in a vehicle interior, has at least one imaging cell which comprises a photorefractive polymer material layer between two transparent substrate carriers in a sealing arrangement, each substrate carrier being provided a transparent electrode layer that faces the photorefractive material, wherein at least one writing light source with a projection that is directed in the direction of the polymer material layer is arranged on one of the transparent substrate carriers parallel thereto, and a haptic sensor-actuator unit and, laterally with respect to the photorefractive polymer material layer, at least one reading light source with a projection that is directed in the direction of the polymer material layer are arranged on the other substrate carrier.

The transparent substrate carrier associated with the writing light source is in this case arranged in the viewing direction of the display unit under the photorefractive polymer material layer, and the other transparent substrate carrier, which is located opposite and is associated with the haptic sensor-actuator unit, is arranged in the viewing direction of the display unit on top of the photorefractive polymer material layer.

By controlling the transparent electrode layers of the substrate carriers and radiating light from the writing light source and light from a reference light source onto the photorefractive polymer material layer, the interactive display unit according to the invention makes possible, on account of the photorefractive polymer material of the polymer material layer, a photorefractive effect, i.e. a light-induced change in refractive index, by way of which three-dimensional storage and presentation of information is possible without an observer of this display unit needing special optical aids, such as for example color-filter glasses. An integrated interactive display unit is made possible by additionally driving the haptic sensor-actuator unit in combination with the 3D presentation using the imaging cell.

The photorefractive polymer material is preferably formed from an organic polymer or liquid polymer material cells. The polymer in that case consists for example of hole transport polymer Poly (for example PVK CAAN or PATPDCAAN copolymer), doped with a non-linear optical (NLO) chromophor (for example PDCST, FDCST, AODCST, TDDCST or 7-DCST), wherein a plasticizer (for example BBP or ECZ) is typically used as a sensitizer.

Using the haptic sensor-actuator unit, haptic signals are both detectable by a user (unit acts as an actuator) and can be generated by him (unit acts as a sensor). By way of example, a user generates a haptic signal as soon as his finger activates a virtual key on a touch field of the interactive display unit, which is detectable using the sensor-actuator unit. The sensor-actuator unit can moreover generate a haptic signal, for example form changes and/or vibrations when applying an electrical voltage, which is detectable by the user and serves for example as confirmation that the pressing of the key was detected by the display unit. A user interface, in particular a human-machine interface, which is matched to the requirements of a user and thus significantly improves the user-friendliness of the interactive display unit, is thereby made possible in a particularly advantageous manner.

Alternatively, it is also conceivable to operate the interactive display unit using a pen or another object, such that, although only indirect interaction between user and display unit is possible, said interaction is considerably improved compared to conventional display units in vehicles without haptic feedback.

The haptic sensor-actuator unit is arranged on an outer side of the associated transparent substrate carrier. The outer side of said substrate carrier is in the present case the surface that is remote from the photorefractive polymer material and thus facing the user of the interactive display unit, such that direct interaction between the user and the interactive display unit is possible.

The haptic sensor-actuator unit is configured as a layer arrangement of alternately arranged actuator layers and electrode layers. The actuator layer, which is controllable using the electrode layers, constitutes a virtual input and/or output field of the interactive display unit with its own electronic switching structure for haptic detection of the activation of the display unit by a user and for haptic feedback. Here, the electrode layers arranged on both sides of an actuator layer act as an anode and cathode, wherein application of electrical voltage causes the actuator layer to transition from a smooth state before the electrical voltage is applied to a structured state with elevations and/or depressions after application of the electrical voltage. By way of additional electrical switching, the structuring of the actuator layer can be changed and/or repeated.

In one preferred embodiment, the actuator layers and the electrode layers are in each case made of an optically transparent material. To this end, the electrode layers are preferably formed, analogously to the electrode layers of the substrate carriers, from indium tin oxide (or ITO in short), which is a semiconductive, largely optically transparent material and exhibits good electrical conductivity and flexible properties. Alternatively, the electrode can be formed from zinc oxide or another thin metal layer.

The material of the at least one actuator layer is preferably made of a polymer, which exhibits change in terms of size and form when it is excited by an electric field, in particular of an electroactive polymer, a metal polymer composite, an ionic gel or a dielectric elastomer (for example silicone and/or acrylic elastomer, and/or polyurethane) or of polyvilidene difluoride, which are particularly suitable as actuator materials. These materials exhibit high elongation, low densities and free formability.

According to one possible embodiment, the haptic sensor-actuator unit is divided into fields. Virtual key fields of a touch and/or sensor unit of the interactive display unit of different types are thus definable. The virtual key fields are preferably freely configurable by corresponding pixel-wise or field-wise actuation using the electrode layers. For example, the extent of the structuring produced and/or change in form can be influenced by the strength of the electric field applied, the dimensioning, form and structuring of the electrodes and/or the thickness of the actuator layer of electroactive polymer.

For protection against external influences on the outer-side sensor-actuator unit, a protective coating is applied to an outer surface of the at least one actuator layer, which protective coating is preferably formed from a polymer with nanoparticles, with scratch-resistant and antireflective properties. Depending on the addition of protective particles, the protective layer can be configured to be suitable for self-cleaning.

For background lighting or reading lighting of the interactive display unit, at least one reading light source (first light source) is arranged laterally of the imaging cell. Preferably, a plurality of reading light sources with different emission spectra for generating red, green and/or blue light are provided. Preferably, the reading light sources are configured as laser units and/or light-emitting diodes with pre-specified emission spectra for light of various colors, the light of which is emitted in the direction of the imaging cell. The reading light source(s) expediently generate light of a frequency that is different from the frequency of the writing light source, as a result of which the information stored in the photorefractive polymer material layer is visible for a user from the outside under irradiation using the reading light source.

The interactive display unit moreover comprises a second light source as a writing light source, which is arranged under the associated transparent substrate carrier, i.e. on a side of the transparent substrate carrier that is remote from the photorefractive polymer material layer. This second light source is preferably configured as a diode laser or as a solid-state laser. For storing and deleting information using the photorefractive polymer material through excitation thereof, the reference light source and a deletion light source with a propagation that is directed likewise in the direction of the photorefractive polymer material layer are provided in addition to the writing light source. The holographic information is here generated and stored through interference of the light beam from the writing light source and the light beam from the reference light source.

A field of micro-lenses, which comprises in particular a plurality of micro-lenses having identical dimensions, which micro-lenses are arranged in a grid in mutually perpendicular rows and columns next to one another or in a hexagonal grid, is arranged between the writing light source and the associated transparent substrate carrier. The micro-lenses mix the colored light from the laser to a desired color temperature and regulate uniform distribution of the light in the interactive display unit.

Arranged upstream of the micro-lens field are, in the radiation direction of the writing light source, an optical diffuser and an optical modulator. The optical modulator is arranged here, in the radiation direction of the writing light source, between the writing light source and the optical diffuser and is preferably formed of a large number of micro-mirrors which are arranged in a hexagonal grid. The grid arrangement of the micro-mirrors largely corresponds to the grid arrangement of the image to be produced. Using the optical modulator, preferably dynamic modulation of the laser beam from the writing light source is possible. The optical diffuser is arranged, in the radiation direction of the writing light source, between the optical modulator and the micro-lens field and expediently serves for homogenization of the laser beam from the writing light source.

Figure 2:
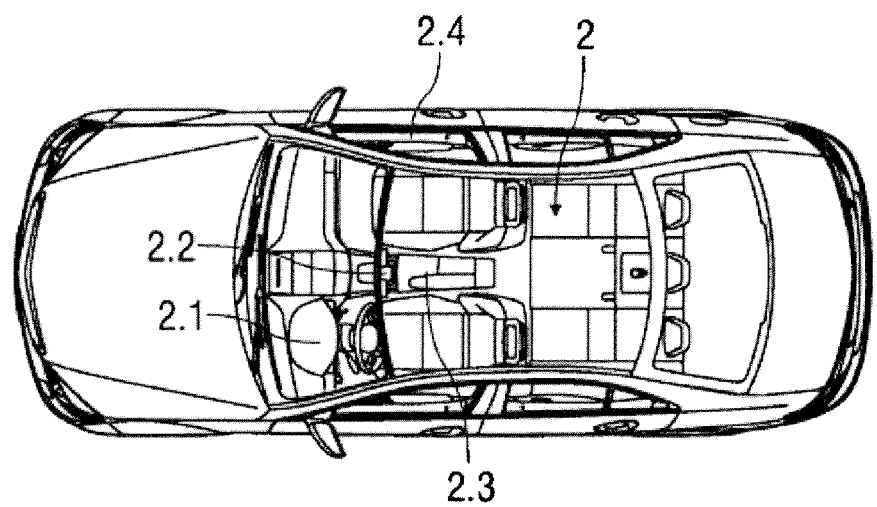

Exemplary embodiments of the invention will be explained in more detail below with reference to the drawings, in which:

FIG. 1 schematically shows a perspective exploded view of an interactive display unit according to the invention and FIG. 2 schematically shows a perspective side view of a vehicle in semi-transparent illustration.

Corresponding parts have the same reference signs throughout all the figures.

FIG. 1 shows an interactive display unit 1 according to the invention in a perspective exploded view.

The interactive display unit 1 is configured as a touch-sensitive display unit 1 and preferably, in a vehicle interior 2 illustrated in more detail in FIG. 2, as a functional interactive central unit for dashboard 2.1, interior console 2.2, center console 2.3 and/or door paneling 2.4.

In the present exemplary embodiment, the interactive display unit 1 has an imaging cell 3, a first light source 4 (reading light source 4 below) and a second light source (writing light source 5 below) and a haptic sensor-actuator unit 6.

Alternatively, the display unit 1 can also comprise a plurality of imaging cells 3.

The imaging cell 3 comprises a photorefractive polymer material 3.3 made of a photorefractive polymer material, which is arranged between a first transparent substrate carrier 3.1 and a second transparent substrate carrier 3.2.

In the present exemplary embodiment, the substrate carriers 3.1, 3.2 are configured in the form of plates and are in each case made of glass, for example. The substrate carriers 3.1, 3.2 in each case have, on a surface facing the photorefractive polymer material layer 3.3, an electrode layer, which electrode layers are preferably formed from a semiconductive, optically transparent material, for example indium tin oxide. High-voltage and consequently an electric field can thus be applied to or used on the photorefractive polymer material layer 3.3.

The photorefractive polymer material layer 3.3 is preferably formed from an organic polymer or liquid polymer material cells. The polymer in that case consists for example of hole transport polymer Poly (for example PVK CAAN or PATPDCAAN copolymer), doped with a non-linear optical (NLO) chromophor (for example PDCST, FDCST, AODCST, TDDCST or 7-DCST), wherein a plasticizer (for example BBP or ECZ) is typically used as a sensitizer.

With the photorefractive polymer material of the polymer material layer 3.3, a photorefractive effect is possible, which generally brings about a change in the optic refractive index of a material via electro-optical effects. That is to say, by lighting the photorefractive polymer using the writing light source 5 and a reference light source (not illustrated in more detail), the light beams of which interfere with one another, electrical space charges are generated in the photorefractive polymer material of the polymer material layer 3.3, which migrate to an active surface of the photorefractive polymer material of the polymer material layer 3.3 and there act locally on the electric field, as a result of which the latter is changed. The space charges thus bring about a modulation of the refractive index of the photorefractive polymer material of the polymer material layer 3.3, as a result of which a hologram is produced. Information, which is formed for example from a bit matrix, is thus storable as a hologram in the display unit 1.

The writing light source 5 is here arranged under the first substrate carrier 3.1, i.e. on a side of the first substrate carrier 3.1 that is remote from the photorefractive polymer material and is preferably configured as a diode laser or solid-state laser. A helium neon laser can alternatively also be used. The corresponding frequency of the laser, for example 532 nm, is in this case dependent on the utilized photorefractive polymer material of the polymer material layer 3.3.

In the radiation direction of the writing light source 5, at its output, an optical modulator (not illustrated in more detail), an optical diffuser (likewise not illustrated in more detail) and a micro-lens field 8 are arranged.

The optical modulator in this case is arranged, in the radiation direction of the writing light source 5, between the latter and the optical diffuser. The optical modulator is preferably formed from a large number of micro-mirrors, which are arranged in a hexagonal grid. The grid arrangement of the micro-mirrors here largely corresponds to the grid arrangement of the image to be generated. Using the optical modulator, preferably dynamic modulation of the laser beam from the writing light source 5 is possible.

The optical diffuser is arranged, in the radiation direction of the writing light source 5, between the optical modulator and the micro-lens field 8 and expediently serves for the homogenization of the laser beam from the writing light source 5.

The micro-lens field 8 comprises a plurality of micro-lenses 8.1 having identical dimensions, which micro-lenses are arranged in a grid in mutually perpendicular rows and columns next to one another or in a hexagonal grid and serve for mixing the colored light from the writing light source 5 to a desired color temperature and to regulate a uniform distribution of the light in the interactive display unit 1.

Furthermore, the reference light source and a deletion light source (not illustrated) with a propagation that is likewise directed in the direction of the photorefractive polymer material layer 3.3 are provided in addition to the writing light source 5 for storing and deleting information using the photorefractive polymer material of the polymer material layer 3.3 through excitation thereof. The frequencies of the light generated by the reference light source and the deletion light source are in this case equivalent or nearly equivalent to the frequency of the light generated using the writing light source 5. The hologram can be generated and stored in particular by way of interference of the light beams from the writing light source 5 and from the reference light source. For deleting the hologram, use of only the deletion light source, which emits homogeneous light, suffices.

In order to present the hologram stored in the photorefractive material of the polymer material layer 3.3, the reading light source 4 is arranged laterally of the imaging cell 3, which reading light source 4 is provided of a plurality of light sources having different emission spectra for generating red, green and/or blue light.

The light sources of the reading light source 4 are configured as laser units and/or light-emitting diodes with pre-specified emission spectra for incoherent light of different colors, the light of which is emitted in the direction of the imaging cell 3.

Moreover, the light generated using the reading light source 4 has a frequency that is different from the frequency of the light generated by the writing light source 5, such that the information stored in the photorefractive polymer material of the polymer material layer 3.3 is visible for a user from the outside under irradiation using the reading light source 4, without the user requiring further optical aids, such as color glasses.

In order to realize direct interaction between a user and the interactive display unit 1, the latter comprises the haptic sensor-actuator unit 6, which is arranged on an outer side of the second substrate carrier 3.2. The outer side of the second substrate carrier 3.2 in this case is that surface that is remote from the photorefractive polymer material layer 3.3 and thus faces a user of the interactive display unit 1.

The haptic sensor-actuator unit 6 in this case comprises an actuator layer 6.2 arranged between two electrode layers 6.1. The haptic sensor-actuator unit 6 alternatively comprises a plurality of alternately arranged actuator layers 6.2 and electrode layers 6.1.

The actuator layer 6.2, which is controllable using the electrode layers 6.1, constitutes a virtual input and/or output field of the interactive display unit 1 with its own electronic switching structure for haptic detection of an activation of the interactive display unit 1 by a user and for haptic feedback.

Here, the electrode layers 6.1 arranged on both sides of an actuator layer 6.2 act as an anode and cathode, wherein application of electrical voltage causes the actuator layer 6.2 to transition from a smooth state before the electrical voltage is applied to a structured state with elevations and/or depressions after application of the electrical voltage. By way of additional electrical switching, the structuring of the actuator layer 6.2 can be changed and/or repeated.

The actuator layer 6.2 and the electrode layers 6.1 are in each case preferably made of an optically transparent material.

To this end, the electrode layers 6.1 are preferably formed from indium tin oxide. Alternatively, the electrode layers 6.1 can be formed from zinc oxide or another thin metal layer.

The individual electrodes 6.1.1 of the electrode layers 6.1 are arranged in an array, which can be seen in particular in the enlarged detail illustration of the haptic sensor-actuator unit 6. Uniform distribution of the electrodes 6.1.1 over an entire surface of the electrode layer 6.1 is thus possible.

The material of the actuator layer 6.2 is preferably made of a polymer, which exhibits change in terms of size and form when it is excited by an electric field, in particular of an electroactive polymer, a metal polymer composite, an ionic gel or a dielectric elastomer (for example silicone and/or acrylic elastomer, and/or polyurethane) or of polyvilidene difluoride, which are particularly suitable as actuator materials. These materials exhibit high elongation, low densities and free formability.

The haptic sensor-actuator unit 6 is preferably divided into fields. Virtual key fields of a touch and/or sensor unit of the interactive display unit 1 of different types are thus definable. The virtual key fields are preferably freely configurable by corresponding pixel-wise or field-wise actuation using the electrode layers 6.1 of the haptic sensor-actuator unit 5. For example, the extent of the structuring produced and/or change in form can be influenced by the strength of the electric field applied, the dimensioning, form and structuring of the individual electrodes 6.1.1 and/or the thickness of the actuator layer 6.2 of electroactive polymer.

For protection against external influences on the outer-side sensor-actuator unit 6, a protective layer 7 having a thickness for example of 30 μm to 100 μm is applied to an outer surface of the actuator layer 6.2, which protective layer is preferably formed from a polymer with nanoparticles, which has scratch-resistant and antireflective properties. Depending on the addition of protective particles, the protective layer 7 can be configured to be suitable for self-cleaning.

The integration of haptic perception and feedback in the interactive display unit 1 improves the user friendliness as compared to conventional display units. Moreover, completely new effect modi for interaction between user and machine without physical keys can be produced.

FIG. 2 shows exemplary embodiments of the interactive display unit 1 according to the invention in a vehicle interior 2, which is semi-transparent in illustration.

The interactive display unit 1 can be used, for example, for displaying information on a dashboard 2.1.

The interactive display unit 1 can furthermore be used in an interior console, center console and door paneling for displaying various vehicle-technological information and/or for entertaining vehicle occupants.

LIST OF REFERENCE NUMERALS

1 interactive display unit
2 vehicle interior
2.1 dashboard
2.2 interior console
2.3 center console
2.4 door paneling
3 imaging cell
3.1 first substrate carrier
3.2 second substrate carrier
3.3 photorefractive polymer material layer
4 reading light source
5 writing light source
6 haptic sensor-actuator unit
6.1 electrode layers
6.1.1 electrodes
6.2 actuator layer
7 protective layer
8 micro-lens field
8.1 micro-lenses

The invention claimed is:

1. An interactive display unit for at least one of presenting information and interaction with a user, comprising:
at least one imaging cell which comprises a photorefractive polymer material layer between two transparent substrate carriers in a sealing arrangement, each transparent substrate carrier being provided with a transparent electrode layer located on a surface of the photorefractive polymer material layer, wherein the transparent electrode layer is controlled to apply voltage to the photorefractive polymer material layer to cause a photorefractive effect;
at least one writing light source, with a propagation that is directed in the direction of the photorefractive polymer material layer, arranged on one of the transparent substrate carriers parallel thereto; and
a haptic sensor-actuator unit and, laterally, at least one reading light source, with a propagation that is directed in the direction of the photorefractive polymer material layer, arranged on the other transparent substrate carrier.

2. The interactive display unit as claimed in claim 1, wherein the haptic sensor-actuator unit is arranged on an outer side of the other transparent substrate carrier, which is remote from the writing light source and the photorefractive polymer material layer.

3. The interactive display unit as claimed in claim 1, wherein the haptic sensor-actuator unit is formed from a large number of alternately arranged actuator layers and electrode layers.

4. The interactive display unit as claimed in claim 3, wherein the actuator layers and the electrode layers are in each case formed from an optically transparent material.

5. The interactive display unit as claimed in claim 4, wherein the optically transparent material of the actuator layer is a conductive polymer.

6. The interactive display unit as claimed in claim 3 wherein the haptic sensor-actuator unit is divided into fields which are controllable using the electrode layers at least one of individually and in groups.

7. The interactive display unit as claimed in claim 1, wherein an outer surface of the haptic sensor-actuator unit which is remote from the photorefractive polymer material has a protective layer.

8. The interactive display unit as claimed in claim 1, wherein the reading light source comprises a plurality of light sources having different emission spectra, wherein the reading light source generates light of a frequency that is different from the frequency of the writing light source.

9. The interactive display unit as claimed in claim 1, wherein a micro-lens field is arranged between the writing light source and the one transparent substrate carrier, which micro-lens field comprises a plurality of micro-lenses having identical dimensions, which micro-lenses are arranged in a grid in mutually perpendicular rows and columns next to one another or in a hexagonal grid.

10. The interactive display unit as claimed in claim 9, wherein an optical diffuser and an optical modulator are arranged upstream of the micro-lens field in the radiation direction of the writing light source.

* * * * *